United States Patent [19]

Kanao

[11] Patent Number: 4,628,966

[45] Date of Patent: Dec. 16, 1986

[54] SYNTHETIC RESIN PIPE FOR UNDERGROUND USE

[76] Inventor: Shiro Kanao, No. 9-18, Nanpeidai 4-chome, Takatsuki-shi, Osaka, Japan

[21] Appl. No.: 696,557

[22] Filed: Jan. 30, 1985

[30] Foreign Application Priority Data

Aug. 9, 1984 [JP] Japan .............................. 59-122687[U]

[51] Int. Cl.$^4$ ............................................. F16L 11/08
[52] U.S. Cl. ..................................... 138/122; 138/121; 138/105; 138/133; 138/173; 138/174; 138/129
[58] Field of Search ............... 138/121, 122, 154, 132, 138/133, 172, 174, 173, 105, 129; 156/143, 195, 244.13

[56] References Cited

U.S. PATENT DOCUMENTS

| | | | |
|---|---|---|---|
| 3,047,026 | 7/1962 | Kahn | 138/122 |
| 3,495,628 | 2/1970 | Boender | 138/154 X |
| 4,140,154 | 2/1979 | Kanao | 138/122 X |
| 4,291,728 | 9/1981 | Cothran | 138/122 |
| 4,304,266 | 12/1981 | Kutnyak et al. | 138/122 X |
| 4,350,547 | 9/1982 | Kanao | 138/122 X |
| 4,510,004 | 4/1985 | Hawerkamp | 138/122 X |

Primary Examiner—James E. Bryant, III
Attorney, Agent, or Firm—Sughrue, Mion, Zinn, Macpeak and Seas

[57] ABSTRACT

A pipe made of a synthetic resin and suitable for underground use which has an improved strength and reliability. In a first embodiment, a helical reinforcing rib is provided by extruding together with a band of resin material which forms the main body of the pipe a corrugated tube. By passing the corrugated tube through the extrusion die, the danger of the wall thickness of the main body of the pipe being reduced is eliminated. In a second embodiment, the reinforcing rib is formed by helically winding a reinforcing member having at least an outer coating of either the same material which forms the main body of a straight-wall pipe or a material having a high fusibility therewith. In this case also, the reinforcing rib can be made from a corrugated tube having a semicircular cross-section.

6 Claims, 12 Drawing Figures

SYNTHETIC RESIN PIPE FOR UNDERGROUND USE

BACKGROUND OF THE INVENTION

The present invention relates to a pipe made of synthetic resin and which is intended for underground use. Particularly, the invention relates to such a pipe having a high pressure resistance and which may be used for an underground water main, a sewer or drain pipe, a pipe for protecting electrical cables, or the like.

A conventional underground pipe of the same general type to which the invention pertains has been manufactured by a process illustrated in FIGS. 1 and 2 of the accompanying drawings. With reference first to FIG. 1, a reinforcing rib 02, used to form corrugations on the exterior surface of the pipe, is manufactured from a corrugated tube 03 having corrugations extending perpendicular to the corrugations of the completed pipe and which is covered with an extruded coating. To form the pipe, the rib 02 is wound around the main body 01 of the pipe in a molten state, pressing the rib 02 into the material of the pipe body 01.

A pipe so constituted is advantageous in that it has a good overall strength and a sufficient resistance to the pressure of the soil in which the pipe is buried. Also, the pipe is light in weight and can be readily handled. On the other hand, the pipe is disadvantageous in that it is difficult to control how far the rib 02 sinks into the material of the pipe body 01 when the rib 02 is being wound around and fused into the material of the pipe body 01. Accordingly, often the rib 02 sinks too far into the pipe body 01, making the pipe weak in such areas.

SUMMARY OF INVENTION

Accordingly, it is an object of the present invention to provide a pipe intended for underground use in which the above-noted difficulty has been eliminated.

In accordance with the above and other objects of the invention, there is provided a pipe intended for underground use and which is made of a synthetic resin in which the position of a reinforcing rib relative to the walls of the main body of the pipe is accurately controlled. In accordance with a first embodiment of the invention, this is achieved by passing the reinforcing rib through the extrusion die used to form the walls of the main body of the pipe, while in a second embodiment, this is achieved by providing a reinforcing rib of which at least an outer coating is made of the same material as the pipe body or a material having a high fusibility with the material of the pipe body. In either case, the reinforcing rib can be constituted by a corrugated tube having a substantially semicircular cross seciton with the flat side directed towards the main body of the pipe. The reinforcing rib is helically wound around the outer circumferential wall of the pipe body.

DESCRIPTION OF THE PREFERRED EMBODIMENTS

Figure 1:
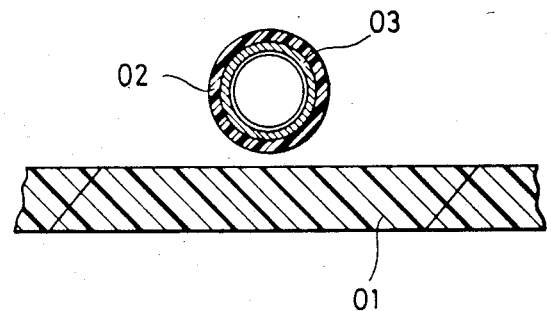
FIGS. 1 and 2 are cross-sectional views used to illustrate a conventional method of manufacturing an underground pipe made of a synthetic resin.
Figure 2:
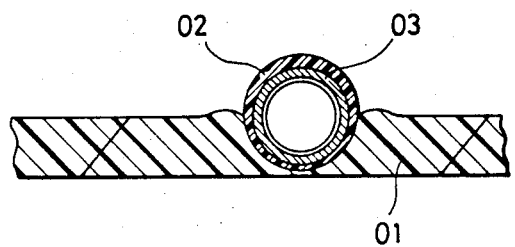

Referring to the drawings, preferred embodiments of the present invention will now be described.

Figure 6:
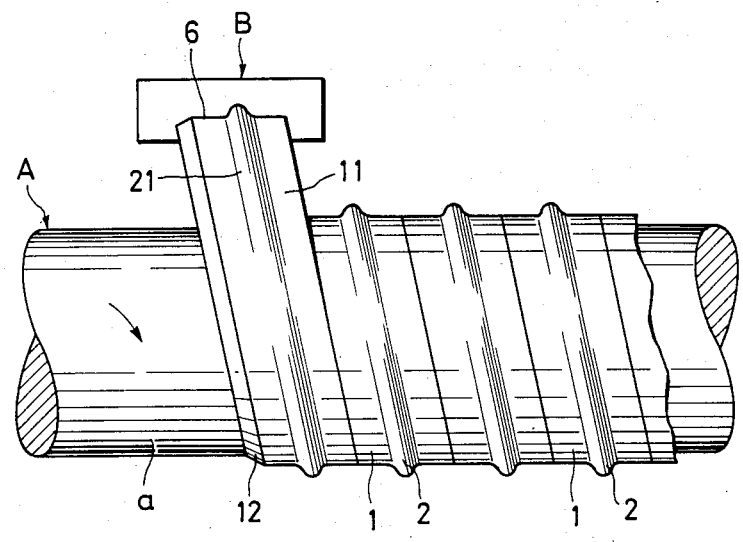
FIG. 6 is a schematic illustration of a method of producing a reinforcing pipe of the invention.

Referring first to FIG. 6, a process for producing a reinforcing pipe of the invention is illustrated. In accordance with an important aspect of the invention, rather than wind a reinforcing rib onto the outer surface of the main body of a pipe after the main body has already been formed, a reinforcing rib 2 is passed through the mouth 6 of an extruder die B simultaneously with the extrusion of a band 11 which is used to form the main body of the pipe. The band 11, in accordance with the conventional practice, has beveled edges 12 (shown more clearly in FIG. 3) so that, when the band 11 is wound on a mandrel of the processing machine A, the edges 12 overlap.

Figure 3:
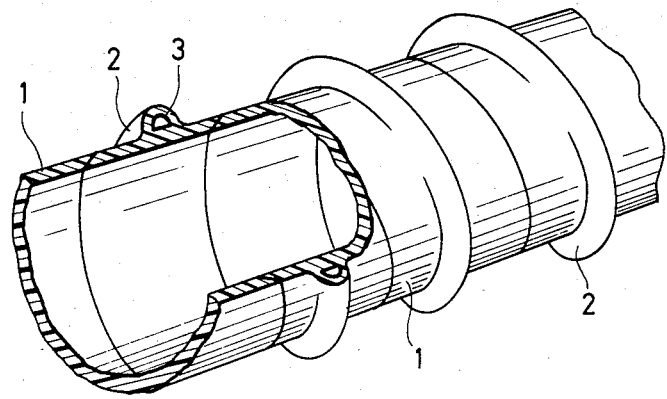
FIG. 3 is a partially cut-away perspective view of a preferred embodiment of the pipe constructed in accordance with the invention.
Figure 4:
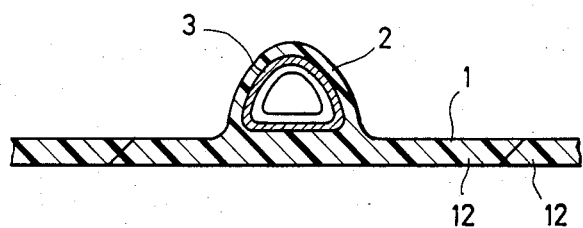
FIG. 4 is a cross-sectional view taken through a reinforcing rib portion of FIG. 3.
Figure 5:
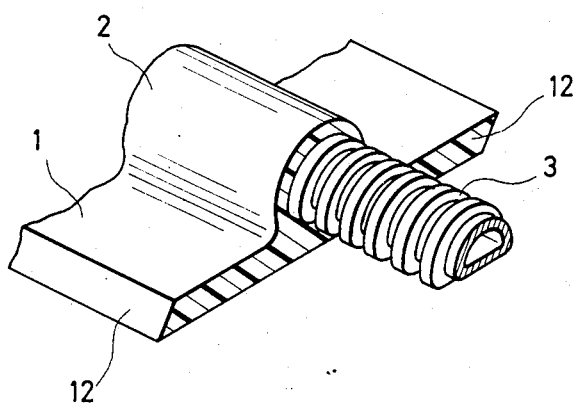
FIG. 5 is a partially cut-away perspective view of the rib portion shown in FIG. 4.

FIG. 3 is a partially cut-away view of the completed pipe, and FIG. 4 is a cross-sectional view taken through the area around the reinforcing rib 21. As seen in FIG. 4, the reinforcing rib 21 is constituted by a corrugated tube 3 surrounded by a layer 2 of the same material as that forming the main body 1 of the pipe. FIG. 5 shows this structure with a portion of the material 2 and the main body 1 removed for clarity.

Figure 7:
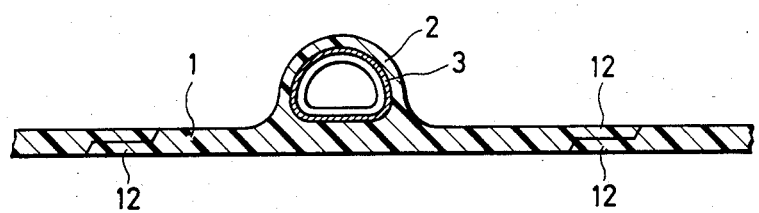
FIGS. 7 and 8 are cross-sectional views showing alternative embodiments of a reinforcing rib structure of the invention.

If desired, the edges 12 of the reinforcing rib 21 can be stepped as shown in FIG. 7.

Figure 8:
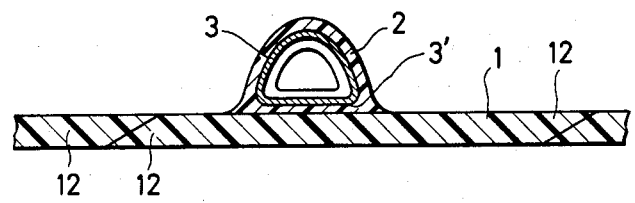
Figure 9:
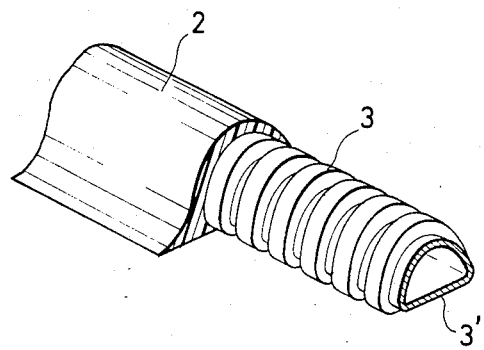
FIG. 9 is a partially cut-away perspective view showing a rib portion of the embodiment of FIG. 8.
Figure 10:
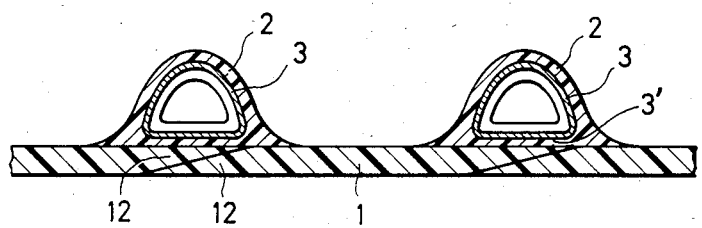
FIG. 10 is a longitudinal cross-sectional view showing a main portion of a still further embodiment of a pipe of the invention.
Figure 11:
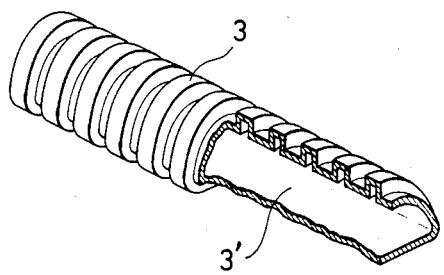
FIGS. 11 and 12 are partially cut-away perspective views of corrugated tubes which may be used in forming underground pipes of the invention.

Referring now to FIGS. 8 through 10, another embodiment of the invention will be described.

As depicted in FIG. 8, the underground pipe of this embodiment is formed by a main body 1 manufactured in the conventional manner as a straight-wall tube. Following the manufacture of the straight-wall tube forming the main body 1, a reinforcing rib is helically wound thereround. The reinforcing rib, as shown in FIG. 8, is constituted by a corrugated tube 3 surrounded by a layer 2 made of the same material as that forming the main body 1 or a material having a high fusibility with the material of the main body 1. Accordingly upon winding the reinforcing rib around the outer surface of the main body 1, the reinforcing rib can be readily bonded thereto without the danger of reducing the thickness of the walls forming the main body 1. As shown in FIGS. 8 and 9, the corrugated tube 3 has a flat surface 3' directed towards the main body 1.

Although, in the embodiment shown in FIG. 8, the reinforcing rib is wound on the outer surface of the main body 1 between edges 12, the reinforcing rib, as shown in FIG. 10, can be wound so as to cover the edges 12.

Figure 12:
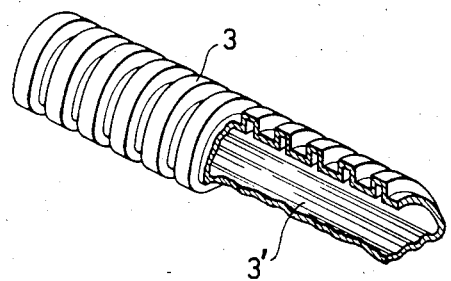

Although the reinforcing tube 3 preferably has a flat surface 3' disposed towards the main body 1, it may, as shown in FIG. 12, have a surface 3' disposed towards the main body 1 in which are formed longitudinally extending corrugation. Further, it is possible to use a corrugated tube 3 having a surface 3' formed with corrugations mating with those of the outer portions.

In accordance with the invention, the synthetic resin material of the pipe may be an olefin material such as polyethylene, polypropylene, or the like. Preferrably, however, a synthetic resin material of the vinyl chloride group is employed for the outer material of the reinforcing rib and main body of the pipe. Of course, other synthetic resin materials can be used, depending upon the application at hand.

The underground pipe of the present invention constructed as described above is advantageous in that it provides a good strength, particularly, a high pressure withstanding strength against soil pressure. Moreover, the pipe is light in weight and easy to handle.

Further, with the invention, there is no danger that the walls of the main body of the pipe will be too thin, thereby providing a pipe which is very reliable and which can be used over long periods of time.

This completes the description of the preferred embodiments of the invention. Although preferred embodiments have been described, it is believed that numerous modifications and alterations thereto would be apparent to one of ordinary skill in the art without departing from the spirit and scope of the invention.

I claim:

1. A pipe suitable for underground use, manufactured by the process of:
    passing a corrugated reinforcing rib through an extrusion die used to extrude a band of material to form a main body of said pipe, and winding said band, including said rib, around a mandrel to form said pipe, said reinforcing rib comprising a corrugated pipe having a semicircular cross-section with a flat side disposed towards said main body of said pipe.
2. The underground pipe of claim 1, wherein said band has beveled edges.
3. The underground pipe of claim 1, wherein said band has stepped edges.
4. A pipe suitable for underground use, manufactured by the process of:
    providing a straight-wall pipe main body made of a synthetic resin material; helically winding around said main body a reinforcing rib, said reinforcing rib comprising a corrugated tube having a semicircular cross-section with a flat side disposed towards said main body, and said rib having at least an outer layer formed around said tube, said outer layer comprising a material having a high fusibility with said resin material of said main body.
5. The underground pipe of claim 4, wherein said flat side is smooth.
6. The underground pipe of claim 4, wherein said flat side has longitudinally extending corrugations formed therein.

* * * * *